Nov. 27, 1928.

W. H. THOMPSON

MACHINE FOR TREATING MATERIALS

Filed March 17, 1924

INVENTOR
William H. Thompson
BY
ATTORNEY.

Patented Nov. 27, 1928.

1,692,964

UNITED STATES PATENT OFFICE.

WILLIAM H. THOMPSON, OF CANTON, OHIO, ASSIGNOR TO THE H. H. MILLER INDUSTRIES COMPANY, OF CANTON, OHIO, A CORPORATION OF OHIO.

MACHINE FOR TREATING MATERIALS.

Application filed March 17, 1924. Serial No. 699,849.

This invention relates to a machine for treating materials, more particularly a material freezing machine of the character used for making ice cream, ices, sherbets and similar products.

One object of the invention is to construct a machine of this character having improved mechanism for agitating, beating or mixing the materials, whereby the transfer of heat therefrom may be rapidly effected.

Another object of the invention is to construct a machine of this character having improved mechanism for operating upon the materials to be treated, the elements of which mechanism are arranged to co-act to bring or move all portions of the materials into contact with the refrigerated walls of the cylinder in a relatively quick manner, whereby the freezing operation is materially shortened.

Another object of the invention is to provide a machine of this character of relatively simple construction and capable of large output.

Another object of the invention is to construct a machine of this character having an improved material agitating mechanism capable of bringing all portions of the material into contact with the wall upon which the temperature changing medium acts, whereby change of temperature of the material is substantially uniformly and rapidly effected.

A further object of the invention consists in providing a device or a plurality of devices which co-act with those elements that move in a path close to the cylinder wall and principally those elements which scrape the material therefrom to move or force the material outwardly against the cylinder wall and in the path of movements of these elements.

A still further object of the invention is to provide a relatively large number of scraping devices, whereby the inner wall is scraped rapidly and substantially continuously to permit a more rapid contact therewith of all portions of the material and resulting reduction in time required for the freezing of the entire batch of material.

Other objects of the invention will be apparent to those skilled in the art to which my invention relates from the following description taken in connection with the accompanying drawings, wherein Fig. 1 is a side elevation of a machine embodying my invention, parts of the machine being broken away.

Figure 1:
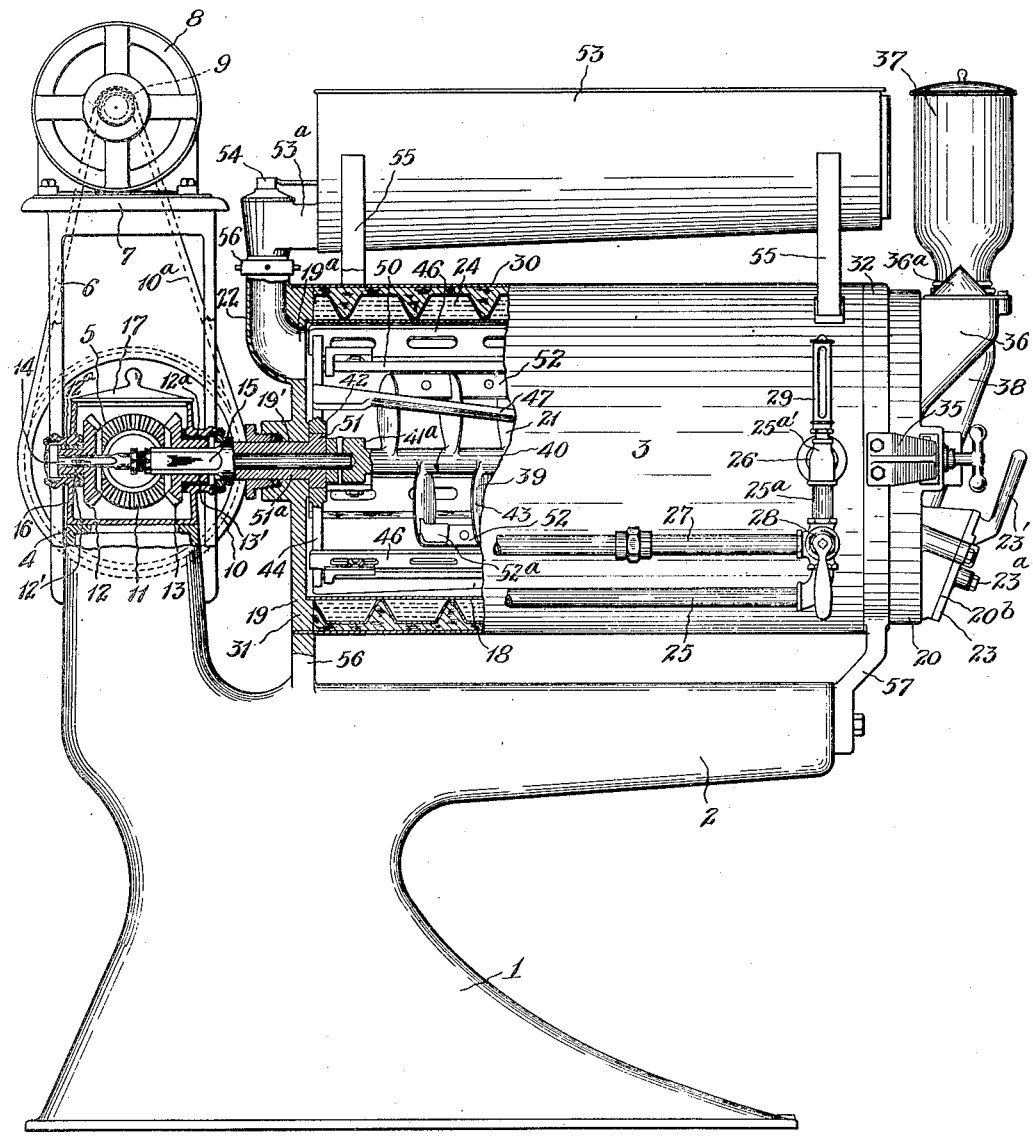

In the drawings, 1 indicates a frame of any desired construction and shape, but preferably fashioned to form a main support 2 for the freezing cylinder, indicated as an entirety at 3, and a supplemenetal support 4 for a driving mechanism which is indicated as an entirety at 5. 6 indicates a pair of standards extending upwardly from the supplemental support 4 and carrying a plate 7 to support a motor 8, of the electric type, which illustrates the preferred means for operating the driving mechanism 5. The shaft of the motor 8 is provided with a pinion 9, over which and a gear 10, a chain $10^a$ runs to drive the latter. The driving mechanism 5 preferably comprises a main bevel gear 11 fixed to the shaft of the gear 10 and bevel gears 12, 13, meshing with the main gear 11; the gears 12, 13, being provided with hubs 12', 13', which are mounted in suitable bearings $12^a$. The bearings $12^a$ are mounted in the side walls of a casing 16, which encloses the driving mechanism 5. The gear hubs 12', 13', are removably fixed to shafts 14, 15, respectively, to which reference will later be made. The casing 16 is of suitable construction for housing the driving mechanism 5, being open at its top and closed by a cover 17.

Figure 2:
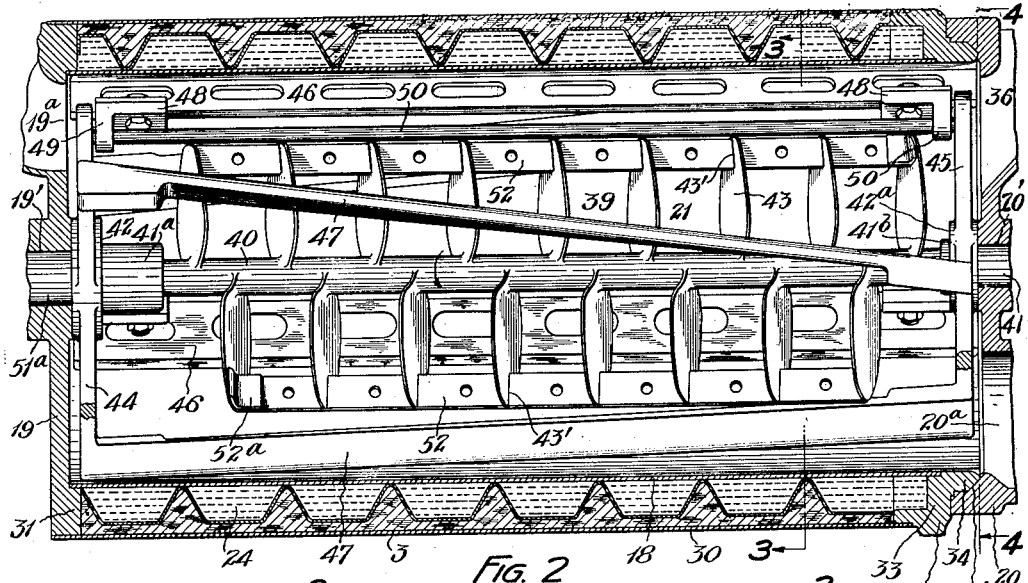
Fig. 2 is a longitudinal section through the freezing cylinder on the line 2—2 of Figs. 3 and 4.
Figure 3:
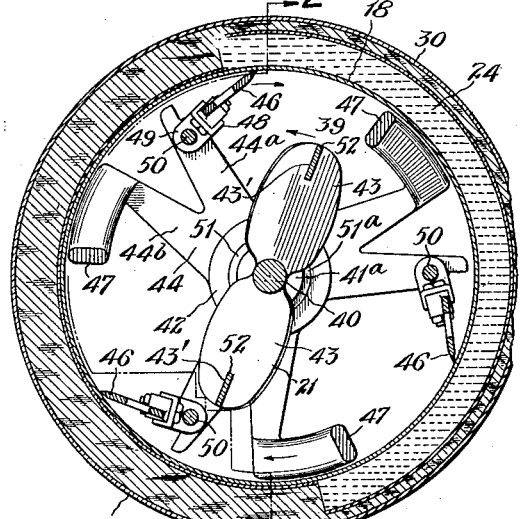
Fig. 3 is a section on the line 3—3 of Fig. 2.

As shown in the drawings, and by preference, the freezing cylinder 3 is arranged horizontally, so that the agitating means, indicated as an entirety at 21, may operate most efficiently upon the material. Of the freezing cylinder 3, 18 indicates a cylinder having a rear head 19 and a front head 20, which co-operate with the wall of the cylinder 18 to form a chamber to receive and hold the material while it is being treated. One of the heads, preferably the rear head 19, is formed with an opening $19^a$ to which a duct or pipe 22 is connected, and serving as an inlet opening and inlet duct, respectively, for the material that is supplied to the cylinder 18 to be treated; and one of said heads, preferably the front head 20 is formed with an opening which serves as the outlet or discharge opening through which the material is discharged after it has been treated. The opening 20ª, as shown in Fig. 2 is opened and closed to any desired extent by a valve 23. The valve 23 may be pivoted upon a suitable stud shaft 23ª, projecting laterally from the front head 20, and operated by the handle 23'. The walls constituting the inlet duct 22 may be formed integrally with the head 19; and the opening 20ª formed in the head 20 may be surrounded by an integrally formed annular wall 20ᵇ to form a suitable seat for the valve 23.

24 indicates a circuitous conduit extending spirally around the cylinder 18, from end to end thereof, and forming a passage through which a suitable temperature changing medium is caused to flow or circulate. In the construction of the machine shown, I provide for the freezing of the material introduced in or supplied to the cylinder 18, for which purpose the temperature changing medium used constitutes a suitable refrigerant, such as brine. The conduit is preferably formed from one or more sheets of metal which are corrugated and such sheet or sheets are bent or rolled into circular form and positioned around the cylinder 18, the corrugations being so arranged that they form a spiral passage when the sheet is positioned around the cylinder 18, and the edges of the corrugations are suitably fixed to the outer wall or surface of the cylinder 18 thus forming between their adjacent portions and the cylinder the passage 24, whereby the refrigerant may flow throughout the conduit or passage in direct contact with the cylinder 18. The circuitous passage 24 is preferably formed and constructed and fixed to the cylinder 18 substantially in the manner set forth in the patent to John C. Miller, No. 878,225, to which reference may be made. 25 indicates a supply pipe for the refrigerant leading to a point near the front end of the cylinder 3 and connected by the branch pipe 25ª to an inlet pipe 26 which is connected with one end of the passage 24. 27 indicates a return pipe for the brine leading from the branch pipe 25ª. The opposite end of the passage 24 is connected to the return pipe 27 (not shown) at a point near the rear end of the freezing cylinder 3. 28 indicates a suitable valve disposed in the connection between the branch pipe 25ª and return pipe 27 and constructed to cut off the flow of brine to the branch pipe 25ª and to the return pipe 27, or to cut off the flow of brine to the branch pipe 25ª and permit its flow through the return pipe 27. 29 indicates a thermometer which may be supported in a suitable opening formed in the elbow 25ª' provided in the branch pipe 25ª. 30 indicates a jacket surrounding the passage or conduit 24 and providing a space between the walls of the sheet metal forming the circuitous passage 24, which space may be filled with suitable material having non-heat conducting characteristics to prevent radiation or conduction of heat, thereby overcoming rise in temperature of the refrigerant while being circulated around the cylinder 18. At the rear of the freezing cylinder 3 the circumferential edges of the cylinder 18 and jacket 30 are secured to the inner and outer circumferential walls, respectively, of a flange 31 projecting inwardly from the inner face of the rear head 19, and the adjacent circumferential edge of the sheet metal from which the circuitous passage 24 is formed is also secured to the flange 31, the manner of securing these edges being such that a liquid tight joint is provided to prevent leakage of the material from the cylinder 18 and leakage of the refrigerant from the passage 24. At its front end, the freezing cylinder 3 is provided with a ring 32 having a flange 33 to which the adjacent circumferential edges of the cylinder 3, jackets 30 and sheet metal forming the passage 24 are secured in a similar manner to form liquid tight joints for these circumferential edges. The ring 32 is provided with an outwardly extending flange 34, the outer surface of which is suitably ground to form a seat for an inwardly extending ground flange 20' provided on the periphery of the front head 20. 35 indicates devices carried by the ring 32 and provided with suitable clamping elements arranged to engage the head 20 and force the latter inwardly to removably clamp the coacting ground surfaces of the flanges 34, 20', in intimate contact, so that the head 20 will be removably supported in engagement with the ring 32, in a liquid tight manner, to prevent leakage of the material from the cylinder 18.

As shown, the inlet opening 19ª is disposed in the upper portion of the rear head 19 so that the cylinder 18 may be readily filled with any predetermined quantity of material, such as cream, sugar and flavoring; and the discharge opening 20ª is disposed in the lower portion of the front head to permit the complete, or substantially complete, emptying of the frozen material by the ejecting means to be later described; this arrangement also permitting the ready introduction of a cleansing solution to the cylinder 18 and its discharge therefrom.

36 indicates a duct extending upwardly from the upper portion of the head 20, the walls of the duct being preferably formed integrally with the head 20. The duct leads through an opening shown in Fig. 2 formed in the head and permits a portion of the material, while it is being frozen, to flow into the duct where it can be seen by the operator. The open end of the duct may be closed by a cap 36ª, pivoted at its rear side to the upper edge of the duct so that it can be moved laterally to uncover the duct 36. 37 indicates a funnel or hopper connected to a duct 38 also leading through an opening (not shown)

formed in the head 20 at one side, which permits the introduction of fruits or other materials into the cylinder 18 at any desired time during the freezing operation. The walls of the duct 38 are preferably formed integrally with the head 20.

Figure 4:
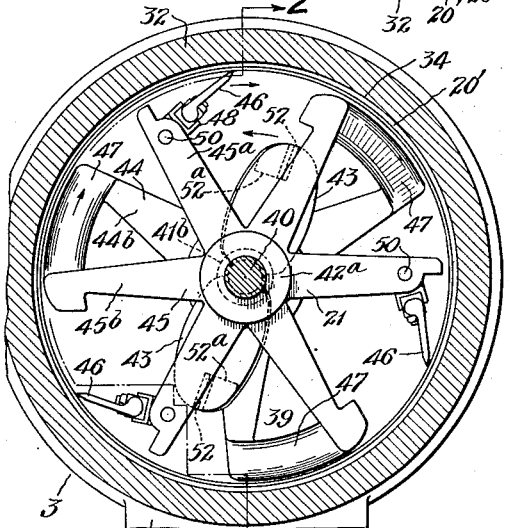
Fig. 4 is a section on the line 4—4 of Fig. 2.
Figure 5:
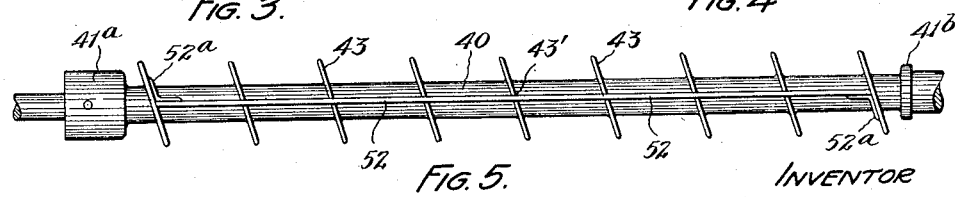
Fig 5 is a detail plan view of the inner agitating member

39 indicates as an entirety means for agitating the material or materials supplied or introduced into the cylinder 18 to be treated or frozen, whereby all portions of the material will be brought into contact with the wall of the cylinder and to thereby enable the refrigerant to absorb the heat of the material and effect freezing or lowering in temperature thereof. In the use of machines of this character, the material, when supplied to the freezing cylinder, usually has a temperature of about forty degrees and resulting from its treatment in the freezing cylinder and at time of discharge therefrom, its temperature is lowered to about twenty-five or twenty-eight degrees, but it will be understood that the material may have a higher or lower temperature when supplied to the cylinder and may also be reduced to a lower degree of temperature while being treated. By the term "agitating" I have reference to the operations of the elements within the cylinder, which elements by their movement therein, cause a beating or whipping action upon the material and movement of portions thereof relative to other portions to mix and stir the same, the purpose being to cause all portions of the material to be quickly and repeatedly brought into contact with the inner surface of the cylinder 18, whereby a transfer of heat from the material will be effected due to the circulation of the refrigerant around its outer surface. As will be later set forth (1) one element or elements of the agitating means 39 serves to scrape off the film of material adhering to the cylinder 18 to mix it with the body portion of the material and to permit other portions of the material to contact with such wall; (2) another element or elements serves to move the material toward that head of the cylinder in which the discharge opening is formed so that upon opening of the valve 23, the material will be ejected or discharged therethrough, and (3) another element of the agitating means serves to move that portion of the material near the central area of the cylinder toward one end of the cylinder, preferably that end opposite to the direction of movement imparted to the material by the ejecting element. Of the agitating means 39, 40 indicates a shaft extending axially of the cylinder 18, the inner or rear end thereof extending through an opening 19' formed in the head 19 and connected through the shaft 14 to the gear 12 or its hub 12' to be driven thereby. The connection of the shaft 14 with the gear 12 is such that the shaft may be disengaged from the gear when the agitating means 39 are removed from the cylinder 18 for cleaning and repair purposes. The opposite or outer end of the shaft 40 is rotatably and removably mounted in a bearing or bushing 41, which is fitted in an opening 20' formed in the head 20. The shaft 40 is provided with collars 41ª, 41ᵇ, to engage the inner faces of collar 42, 42ª to which reference will later be made. 43 indicates spaced blades preferably formed integrally with and extending laterally from opposite sides of the shaft 40 in a radial direction. The blades 43 are disposed at an angle to a plane extending transversely of the cylinder so that during their revolution in the cylinder 18 they will act on the material to move it toward one end of the cylinder. In the preferred arrangement, as shown, the shaft 40 is driven in a counter-clockwise direction as viewed from the front end of the cylinder (see Fig. 4) and the blades are disposed so as to move the material toward the rear end or head. 44, 45, indicate spiders rotatably mounted on the shaft 40 and disposed adjacent to the heads 19, 20. The spiders 44, 45, comprise the collars 42, 42ª, (already referred to), pairs of arms 44ª, 45ª, (preferably three pairs) and pairs of arms 44ᵇ, 45ᵇ, (preferably three pairs), which pairs of arms carry at their outer ends elements 46, 47, respectively. The elements 46, 47, extend longitudinally of the cylinder and move in a path, measured radially of the cylinder, beyond the ends of the blades 43. The elements 46 consist of scraping members having relatively sharp outer edges arranged to engage the inner surface of the cylinder 18 and to scrape the material therefrom. The opposite ends of each scraping member are bolted or otherwise connected to plates 48 having lugs 49, which are pivoted upon a rod 50 connected to the arms of the adjacent pair 44ª, 45ª, whereby the scrapers may swing outwardly, due to centrifugal force, to insure their scraping engagement with the cylinder 18. Each of the elements 47 preferably comprises a bar of spiral shape connected to and supported by one pair of arms 44ᵇ, 45ᵇ. In addition to their function of agitating the material in a direction about the axis of the cylinder, the spiral shape of the bars 47 permits them to move the material toward the front end of the cylinder, whereby they function to eject or discharge the material through the opening 20ª when the valve 23 is operated to open the latter. The bars 47 also serve to spread the material on the cylinder wall as they revolve, for which purpose their outer side edges may be of convexed shape. The elements 46, 47, are alternately arranged upon the pairs of arms to provide for uniformity of action as they revolve about the axis of the cylinder 18. The rods 50 and elements 47 operate to connect the spiders 44, 45, together as a unitary structure, so that they may be rotated on the shaft 40. As shown in Fig. 1, the collar 42 is secured in any desired manner to the flange 51 of a sleeve shaft 51ª which surrounds the shaft 40 and extends through the opening 19' and has its outer end connected through the shaft 15 to the gear 13, or its hub 13', by which it is driven. The spiders 44, 45, are spaced apart so that the collars 42, 42ª, thereof rotate in engagement with the inner faces of the heads 19, 20 or suitable bosses provided thereon and surrounding the openings 19', 20', the former collar and flange 51 also operating to limit the inward movement of the agitating means 39 when it is being assembled or positioned in the cylinder 18 and the shafts 41 and 51ª connected to the gears 12, 13, respectively.

52 indicates devices carried by blades 43 and shaped and arranged to engage the material and impel or force it outwardly toward the wall of the cylinder 18. These devices are carried by the blades 43, and move relative to—and in preferred form of construction, in the opposite rotative direction, the elements 47, thereby co-acting with these elements to additionally agitate the material but more particularly to impel the material, immediately following the scraping of the cylinder wall, quickly back into engagement therewith. Thus it will be seen that there are (1) a plurality of elements which operate at uniformly spaced points, to continuously scrape the material from the cylinder wall and force it inwardly therefrom, and (2) a plurality of spaced devices which continuously operate to impel the material outwardly toward the cylinder wall, so that portions of the material are being caused to engage and disengage the cylinder wall in a rapid manner. The devices 52 may comprise wings or paddles disposed so that their flat faces extend substantially radially and each carried by one or more of blades, but in the preferred form of construction, I provide each blade with a device and connect them all together in the form of a single flat strip or relatively narrow plate and form in the free ends of the intermediate blades 43 of each set, inwardly extending radial slots 43' to receive the strip, the latter being secured in the slots in any well known manner and its opposite ends being preferably secured to the inner faces of the extreme end blades 43 by angle plates 52ª. I provide a plurality of impelling devices 52, preferably one carried by each set of blades 43. The width of the devices 52 may be varied and if desired they may extend outwardly or in a substantially radial direction beyond the free ends of the blades 43.

In the operation of the machine, the valve 28 is operated to supply the brine or other refrigerant to the passage 24 and the driving mechanism set in operation to rotate the shafts 14, 15, and through them the agitating elements 46, 47; then a predetermined quantity of material to be frozen is supplied through the inlet duct 22 to the cylinder 18. The freezing operation continues until the material is found to be in the desired condition for discharge, which condition may be determined by any suitable test, whereupon the valve 23 is opened. Upon the opening of the valve, the material will be ejected in a rapid manner due to the action of the bars 47, as already described. In emptying the cylinder 18, a suitable receptacle is placed below the opening 20ª, to receive the frozen material. In operating the machine, the valve 28 may be operated to shut off the flow of the refrigerant at any time, at will; also, crushed fruits and other flavoring materials may be introduced through the funnel 37 at any time.

To facilitate filling of the cylinder 18, a batch tank 53 or other form of measuring mechanism may be provided in superposed relation to the freezing cylinder 3 and connected by an outlet 53ª, which is controlled by a valve 54, leading to the inlet end of the duct 22. In the illustrated construction, the batch tank is supported by legs 55 on the freezing cylinder 3 and the outlet 53ª is connected by a union 56 with the duct 22.

By arranging the freezing cylinder 3 in a horizontal position, the agitating means may operate in and upon the material from end to end of the cylinder 18, and may be operated at a relatively low speed and with less strain upon the bearings and driving mechanism, and complete the freezing operation in a relatively short period of time, since the material does not have to be lifted to a great height to effect the necessary agitation as is the case where the cylinder is disposed vertically.

The freezing cylinder 3 is preferably supported on and rigidly connected to the main support 2 by suitable arms 56, 57, the former extending upwardly from the frame 1 and engaging the rear head to which it is secured and the latter extending downwardly from the ring 32 and secured to the front end of the support 2.

To those skilled in the art to which my invention relates, many changes in construction and widely differing embodiments and applications of the invention will suggest themselves without departing from the spirit and scope thereof. My disclosures and the description herein are purely illustrative and are not intended to be in any sense limiting.

What I claim is:—

1. In a machine of the class described, the combination of a cylinder for material having an inlet and an outlet, means for applying a temperature changing medium around the outer surface of said cylinder, members mounted to rotate within said cylinder and relative to each other, one of said members operating to scrape the material from the inner surface of said cylinder and the other of said members having a longitudinally extending device operating to impel the material toward the wall of said cylinder, and means for operating said members.

2. In a machine of the class described, the combination of a cylinder for material having an inlet and an outlet, means for applying a temperature changing medium around the outer surface of said cylinder, members mounted to rotate within said cylinder in different paths measured radially thereof and relative to each other, said outer member operating to scrape the material from the inner surface of said cylinder and said inner member comprising devices for moving the material toward one end of the cylinder and separate means operating to impel the material in a substantially outward direction against said inner surface, and means for operating said members.

3. In a machine of the class described, the combination of a cylinder for material having an inlet and an outlet, means for applying a temperature changing medium around the outer surface of said cylinder, inner and outer members mounted to rotate within said cylinder in different paths measured radially thereof and relative to each other, said outer member operating to scrape the material from the inner surface of said cylinder, and said inner member comprising a plurality of blades arranged to propel the material toward one end of the cylinder and an element carried by said blades and operating to impel the material substantially outwardly against said inner surface, and means for operating said members.

4. In a machine of the class described, the combination of a cylinder for material having an inlet and an outlet, means for applying a temperature changing medium around the outer surface of said cylinder, inner and outer members mounted to rotate within said cylinder in different paths measured radially thereof and relative to each other, said outer member comprising an element adapted to move the material toward said outlet and an element operating to scrape the material from the inner surface of said cylinder and said inner member comprising a plurality of blades arranged to propel the material toward one end of the cylinder and an element carried by said blades and operating to impel the material substantially outwardly against said inner surface, and means for operating said members.

5. In a machine of the class described, the combination of a cylinder for material having an inlet and an outlet, means for applying a temperature changing medium around the outer surface of said cylinder, inner and outer members mounted to rotate within said cylinder in different paths measured radially thereof and relative to each other, said outer member operating to scrape the material from the inner surface of said cylinder and said inner member comprising a plurality of blades arranged to propel the material toward one end of the cylinder and an element carried by said blades and disposed substantially radially and operating to impel the material substantially outwardly against said inner surface, and means for operating said members.

6. In a machine of the class described, the combination of a cylinder for material having an inlet and an outlet, means for applying a temperature changing medium around the outer surface of said cylinder, outer and inner members mounted to rotate within said cylinder and relative to each other, said outer member operating to scrape the material from the inner surface of said cylinder and said inner member operating to move portions of the material toward one end of the cylinder, and a device carried by said inner member arranged to impel the material outwardly toward the wall of said cylinder, and means for operating said members.

7. In a machine of the class described, the combination of a cylinder for material having an inlet and an outlet, means for applying a temperature changing medium around the outer surface of said cylinder, inner and outer members mounted to rotate within said cylinder in different paths measured radially thereof and relative to each other, said outer member operating to scrape the material from the inner wall of said cylinder, and said inner member operating to move one portion of the material toward one end of said cylinder, a device carried by said inner member and extending from end to end thereof and arranged to impel the material outwardly toward the wall of said cylinder, and means for operating said members.

8. In a machine of the class described, the combination of a cylinder for material having an inlet and an outlet, means for applying a temperature changing medium around the outer surface of said cylinder, inner and outer members mounted to rotate within said cylinder in different paths measured radially thereof and relative to each other, said outer member operating to scrape the material from the inner surface of said cylinder and said inner member comprising series of blades arranged to propel the material toward one end of the cylinder and an element carried by each series of said blades and operating to impel the material substantially outwardly toward the wall of said cylinder, and means for operating said members.

9. In a machine of the class described, the combination of a cylinder for material having an inlet and an outlet, means for applying a temperature changing medium around the outer surface of said cylinder, inner and outer members mounted to rotate within said cylinder in different paths measured radially thereof and relative to each other, said outer member comprising an element adapted to move the material toward said outlet and an element operating to scrape the material from the inner surface of said cylinder and said inner member comprising series of blades arranged to propel the material toward one end of the cylinder having slots formed in their free ends and elements mounted in the slots formed in said blades and operating to impel the material substantially outwardly toward the wall of said cylinder, and means for operating said members.

10. In a machine of the class described, the combination of a cylinder for material having an inlet and an outlet, means for applying a temperature changing medium around the outer walls of said cylinder, inner and outer members mounted to rotate within said cylinder in different paths measured radially thereof and relative to each other, said outer member operating to scrape the material from the inner surface of said cylinder and said inner member comprising a plurality of blades arranged to propel the material toward one end of the cylinder and a longitudinally extending strip, having its active face disposed substantially radially and carried by said blades, operating to impel the material substantially outwardly against said inner surface, and means for operating said members.

In testimony whereof I affix my signature.

WILLIAM H. THOMPSON.